United States Patent
Serra

[11] Patent Number: 5,758,495
[45] Date of Patent: Jun. 2, 1998

[54] DEVICE FOR EXHAUST SILENCERS OF ENGINES WITH ELECTROSTATIC FIELD

[76] Inventor: Efisio Serra, via Belloni, 50, 00147 Rome, Italy

[21] Appl. No.: 656,305

[22] PCT Filed: Dec. 29, 1994

[86] PCT No.: PCT/IT94/00219

§ 371 Date: Jun. 14, 1996

§ 102(e) Date: Jun. 14, 1996

[87] PCT Pub. No.: WO96/14498

PCT Pub. Date: May 17, 1996

[30] Foreign Application Priority Data

Nov. 7, 1993 [IT] Italy ................ RM94A0714

[51] Int. Cl.[6] ........................................ F01N 3/02
[52] U.S. Cl. ............................... 60/275; 60/311
[58] Field of Search ............................ 60/275, 311

[56] References Cited

U.S. PATENT DOCUMENTS

| | | | |
|---|---|---|---|
| 3,489,669 | 1/1970 | Ruhnke | 204/665 |
| 3,653,185 | 4/1972 | Scott et al. | 60/275 |
| 4,304,096 | 12/1981 | Liu et al. | 60/275 |
| 4,669,671 | 6/1987 | Hastings | 239/690.1 |
| 4,687,493 | 8/1987 | Dickey | 55/2 |
| 4,871,515 | 10/1989 | Reichle et al. | 60/275 |
| 4,949,539 | 8/1990 | Hsu et al. | 60/275 |
| 4,956,152 | 9/1990 | Keough et al. | 60/275 |
| 5,053,914 | 10/1991 | Wessel et al. | 60/275 |
| 5,557,923 | 9/1996 | Bolt et al. | 60/275 |

FOREIGN PATENT DOCUMENTS

| | | | |
|---|---|---|---|
| 256325 | 2/1988 | European Pat. Off. . | |
| 299197 | 1/1989 | European Pat. Off. . | |
| 2413 | 1/1982 | Japan | 60/275 |
| 163413 | 6/1989 | Japan | 60/275 |

*Primary Examiner*—Willis R. Wolfe
*Attorney, Agent, or Firm*—Beveridge, DeGrandi, Weilacher & Young LLP

[57] ABSTRACT

The device according to the present invention provides a relevant and, in some cases, total reduction of nitrogen oxide, carbon monoxide and particles of the unburnt gases of the exhaust which, before getting out of the silencer, are led between to electrodes kept at a high electrostastic potential difference, by means of a Van De Graaf generator or similar, so as to deviate the present and/or induced ions onto apposite containers, which may be replaced and regenerated after a determined working time.

3 Claims, 1 Drawing Sheet

DEVICE FOR EXHAUST SILENCERS OF ENGINES WITH ELECTROSTATIC FIELD

BACKGROUND OF THE INVENTION

1. Field of the Invention

The present invention concerns a device applied to or inserted inside exhaust silencers of engines for the reduction of pollution gases by means of high tension electrostatic fields.

2. Description of the Related Art

The serious problem of atmospheric pollution is known, due to the exhaust gases of combustion engines, which at present is not solved by the conventional silencers, which have an insufficient absorption, nor by the recent catalytic silencers which request—for obtaining good functioning levels—high temperatures, which can be obtained only after a long and continuous working time.

SUMMARY OF THE INVENTION

The present invention has its origin in the discovery of the deviation efficiency of a high tension electrostatic field, due to its direct action onto the ions present in the pollution as well as due to the induction effect onto the neutral particles present in the exhaust gases.

The device according to the present invention determines a relevant and, in some cases, total reduction of the nitrogen oxide, of the carbon monoxide and of the particles of the unburnt gases of the exhaust which, before getting out of the silencer, are led between electrodes kept at a high electrostatic potential difference, by means of a Van De Graaff generator or similar, so as to deviate the present and/or induced ions onto apposite containers, which may be replaced and regenerated after a determined working time.

DESCRIPTION OF THE PREFERRED EMBODIMENT

Figure 1:
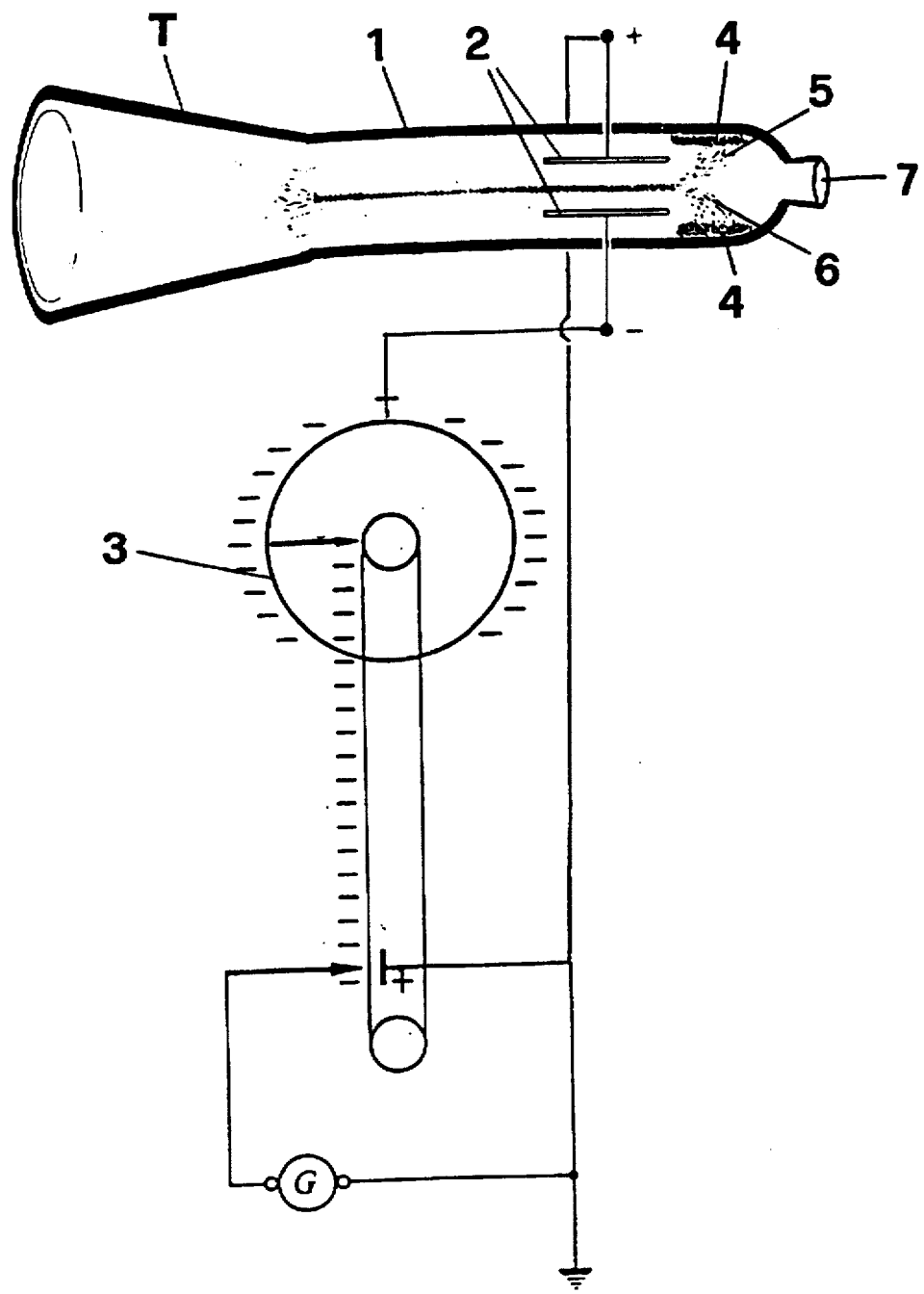
FIG. 1 shows the present invention.

The device according to the present invention will be described in detail hereinbelow according to FIG. 1 in which a device is shown inserted inside or applied to the exhaust silencer T of an engine of the kind used in vehicles. The exhaust silencer T is formed with a container 1 applied to the end part of the exhaust silencer T or inserted inside the same. There are two electrodes 2 within the container 1. The two electrodes 2 are kept at a potential difference of many thousands of volts by an electrostatic generator 3. The two electrodes 2 provide a strong electrostatic field through which the exhaust gases pass on their way to the outlet 7. The electrostatic field causes the negative ions 5 to deviate towards the positive pole and the positive ions 6 to deviate towards the negative pole, until they reach the collectors 4 provided on the internal walls of the container 1. At the collectors 4, the ions lose their kinetic energy when they strike against layers of rock wool, glasswool or other suitable materials, and are therefore prevented from diffusion into the air through exhaust outlet 7. A high tension electrostatic generator 3, of the Van De Graaff kind, with a rubbin generator G or similar is carried by the vehicle. The high tension electrostatic generator 3 has a sphere and electrodes with opposite signs connected to the electrodes 2 so as to bring them to potential differences of many thousands of volts.

I claim:

1. A device connected to an exhaust silencer of an engine comprising:

a container connected to the exhaust silencer, said container having an internal wall, an outlet, two electrodes housed within said container and spaced apart to form an electrostatic field, a high tension electrostatic generator electrically connected to said electrodes to provide a potential difference between said electrodes, said high tension electrostatic generator including a rubbin generator, a sphere, a positive output connected to said rubbin generator and said sphere, and a negative output connected to said sphere, wherein said positive output is electrically connected to one of said electrodes and said negative output is electrically connected to the other one of said electrodes, and two collectors housed within said container along said internal wall near said outlet and spaced apart from each other and said electrodes, wherein one of said collectors is a negative pole and the other of said collectors is a positive pole; and wherein the electrostatic field charges ions in an exhaust gas passing through said container to exit through said outlet such that positive ions deviate toward the negative pole and negative ions deviate toward the positive pole.

2. The device according to claim 1, wherein said container is installed within the silencer.

3. The device according to claim 1, wherein said collectors are made from either rock wool or glasswool.

* * * * *